(No Model.)

H. HAMMOND.
PROCESS OF FORMING THE EDGES OF AXES.

No. 326,645. Patented Sept. 22, 1885.

Witnesses:
Frank H. Pierpont
A. C. Tanner

Inventor:
Henry Hammond
by Albert H. Walker, his Atty.

UNITED STATES PATENT OFFICE.

HENRY HAMMOND, OF NEW HAVEN, CONNECTICUT.

PROCESS OF FORMING THE EDGES OF AXES.

SPECIFICATION forming part of Letters Patent No. 326,645, dated September 22, 1885.

Application filed March 23, 1885. (No model.)

*To all whom it may concern:*

Be it known that I, HENRY HAMMOND, of New Haven, Connecticut, have invented a new and useful Process of Forming the Edges of Axes Preparatory to Sharpening them by Grinding, of which the following description and claim constitute the specification, and which is illustrated by the accompanying sheet of drawings.

This process consists of shearing off the blade of the ax on the line of its desired edge, instead of upsetting it with a hammer, as heretofore; and its superiority consists in the fact, of which I claim to be the original and first discoverer, that shearing off does not injure the grain or disarrange the crystallization of the metal as upsetting does.

Figure 1:
Figure 2:
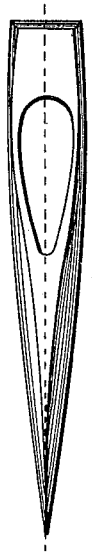
Figure 3:

Figure 1 is a side view of an unfinished ax, the blade of which has been drawn down to the proper thinness, but the edge of which blade still has an irregularity of outline consequent on such drawing down. Figs. 2 and 3 are edge and side views, respectively, of the ax of Fig. 1 after the edge of its blade has been formed to the desired curve by the shearing process.

The process of shearing the unfinished ax of Fig. 1, on the curved dotted line in that figure, leaves the metal above that line in a state of uniform density and undisturbed crystallization, whereas the process of producing the same regular-curved edge by upsetting leaves the metal adjacent to the edge in a state of variant density and broken crystallization. That state of variant density results from the varying number of blows or varying amount of pressure used in upsetting different parts of the edge, and made necessary by the fact that the different parts of the edge of the unfinished ax present different degrees of irregularities to be removed; and that state of broken crystallization results from the blows or pressure used in upsetting the edge, and administered in the direction of the dotted line in Fig. 2. The edges of axes made by upsetting, and which, therefore, are in a state of variant density and broken crystallization of metal, are very apt to be cracked in tempering, or broken in use, whereas the edges of axes made by the shearing process, being free from those faults, are not apt to be thus cracked or thus broken.

The shearing process can be performed with any suitable shearing mechanism; but I prefer to use for that purpose the shearing-die described and claimed in my application of December 26, 1884, for Letters Patent of the United States of America.

I am aware that I was not the first person to form articles in metal by shearing; but I believe that no one before me ever thus formed the edge of the blade of an ax. My process of doing that is based on my discovery of the peculiar utility of shearing when applied to axes, as compared with former methods of forming the edges of the blades of those implements, and it does not constitute merely a new use of an old process without any novel result. The fact that my process obviates an evil long recognized but never removed by other skilled ax-makers is enough to show that my process constitutes a true invention.

I claim as my invention—

The process of forming the edge of the blade of an ax preparatory to grinding by shearing off the blade on the line of the proposed edge, substantially as described.

HENRY HAMMOND.

Witnesses:
   ALBERT H. WALKER,
   WILLARD EDDY.